US008319649B1

(12) United States Patent
Devane

(10) Patent No.: US 8,319,649 B1
(45) Date of Patent: Nov. 27, 2012

(54) INSECT ELECTROCUTION DEVICE WITH COUNTER

(76) Inventor: James E. Devane, Clinton, MD (US)

( * ) Notice: Subject to any disclaimer, the term of this patent is extended or adjusted under 35 U.S.C. 154(b) by 302 days.

(21) Appl. No.: 12/715,944

(22) Filed: Mar. 2, 2010

Related U.S. Application Data

(60) Provisional application No. 61/208,798, filed on Mar. 2, 2009.

(51) Int. Cl.
G08B 23/00 (2006.01)
(52) U.S. Cl. .............. 340/573.2; 340/552; 340/556; 340/561; 43/112; 43/132.1
(58) Field of Classification Search .......... 340/552, 340/556; 43/112, 132.1–144
See application file for complete search history.

(56) References Cited

U.S. PATENT DOCUMENTS

| | | | |
|---|---|---|---|
| 1,962,420 A | 6/1934 | Bradley | |
| 2,061,458 A | 11/1936 | Folmer et al. | |
| 3,823,506 A * | 7/1974 | Iannini | 43/112 |
| 3,950,886 A | 4/1976 | Newhall et al. | |
| 3,986,292 A | 10/1976 | Klebanoff | |
| 4,121,371 A | 10/1978 | Kaphengst et al. | |
| 4,179,839 A * | 12/1979 | Salotti et al. | 43/112 |
| 4,182,069 A | 1/1980 | De Yoreo | |
| 4,275,523 A * | 6/1981 | Baima et al. | 43/112 |
| 4,959,923 A | 10/1990 | Aiello et al. | |
| 5,206,596 A | 4/1993 | Beihoff et al. | |
| 6,055,766 A * | 5/2000 | Nolen et al. | 43/112 |
| 6,493,363 B1 * | 12/2002 | Weaver et al. | 370/539 |
| 6,564,503 B1 * | 5/2003 | Miyahara et al. | 43/112 |
| 6,594,946 B2 | 7/2003 | Nolen et al. | |
| 7,071,829 B2 | 7/2006 | Gardner, Jr. | |
| 7,779,575 B2 * | 8/2010 | Hirafuji et al. | 43/112 |

* cited by examiner

Primary Examiner — Albert Wong
Assistant Examiner — Peter Mehravar
(74) Attorney, Agent, or Firm — Montgomery Patent & Design, LLC; Robert C. Montgomery; Joseph Yaksich

(57) ABSTRACT

An electronic insect electrocution device with an integral display and counting means that displays the number of discharges, or "zapped" insects is herein disclosed. The device comprises a lamp enclosed within an enclosure comprising series of alternating grids energized by a voltage increasing device, which electrocutes any insects that fly towards the lamp. A numeric digital display is provided on the top of the enclosure and reflects the current number of discharges or killed insects. The counter is provided with an input signal that detects the voltage fluctuation of the grid every time an insect is killed. This detection circuit drives a counting circuit which interfaces with the counter. It is reset every time the unit is unplugged.

16 Claims, 6 Drawing Sheets

INSECT ELECTROCUTION DEVICE WITH COUNTER

RELATED APPLICATIONS

The present invention was first described in and claims the benefit of U.S. Provisional Application No. 61/208,798 filed Mar. 2, 2009, the entire disclosures of which are incorporated herein by reference.

FIELD OF THE INVENTION

The present invention relates generally to insect control devices, and in particular, to an electric insect exterminating apparatus with built-in counting capabilities.

BACKGROUND OF THE INVENTION

The presence of unwanted insects is a prominent annoyance, especially during peak times such as the summer months. Insect population is especially an issue in outdoor settings such as camping sites, porches, picnics, and the like during such times. As such, many different methods are utilized in an attempt to control insect presence and population in localized settings. These methods include scented candles and torches, insect repellents, insect traps, insecticides, and the like. Another popular device is that of electrical insect lures which generally utilize light as an attracting means and which provide electrocution capabilities for the extermination of insect populations. However, such devices are limited in their scope of capabilities.

Various attempts have been made to provide household insect electrocution assemblies. Examples of these attempts can be seen by reference to several U.S. patents. U.S. Pat. No. 3,986,292, issued in the name of Klebanoff, describes an insect killing device which uses a domestic AC voltage supply in a conventional manner.

U.S. Pat. No. 6,594,946, issued in the name of Nolen et al., describes a mosquito and biting insect attracting apparatus which utilizes alternative attractants such as chemical sources in order to lure and exterminate insects.

While these apparatuses fulfill their respective, particular objectives, each of these references suffer from one (1) or more of the aforementioned disadvantages. Many such apparatuses do not provide any aesthetic or entertainment value to a user. Also, many such apparatuses do not have any means of providing data or other useful information to a user during periods of usage. Accordingly, there exists a need for an insect electrocution device without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide an insect electrocution device which provides enhanced entertainment and interest to a user while simultaneously providing added utility through the collection and display of relevant data. Thus, the object of the present invention is to solve the aforementioned disadvantages and provide for this need.

To achieve the above objectives, it is an object of the present invention to comprise an electronic insect zapper which utilizes electrocution as an insect control means and which further displays a running total of the amount of insects exterminated. The apparatus comprises upper and lower structures, a grill, an outer grid, an inner grid, a lamp, and a counter.

Another object of the present invention is to comprise a durable waterproof structure which consists of upper and lower structures integrally attached via the grill, which creates a lantern-shaped body with a plurality of widely meshed sides to protect users from accidentally being electrocuted.

Yet still another object of the present invention is to comprise a side surface of the upper structure of a recessed digital display which displays digital numerals corresponding to the count on an internal counter. The numeric display increments each time an insect is electrocuted, via the internal counter.

Yet still another object of the present invention is to provide insect attracting features including a replaceable lamp which comprises a common insect attracting illuminating device such as a fluorescent lamp, neon lamp, ultraviolet lamp, or the like.

Yet still another object of the present invention is to comprise a plurality of wire mesh grids which are electrified by a transformer, with a gap between the grids which is bridge when an insect enters the apparatus, thereby increasing the input voltage and electrocuting the insect in a conventional manner.

Yet still another object of the present invention is to comprise a voltmeter connected to the internal counter. The voltmeter is adapted to detect voltage increases resultant from insects being electrocuted. Upon such a voltage increase, the voltmeter increments the internal counter and thereby increases the digital display by one (1).

Yet still another object of the present invention is to comprise a power cord adapted to be utilized with conventional residential power supplies. A user may reset the digital counter by unplugging the apparatus and removing the power to the counter.

Yet still another object of the present invention is to provide a method of utilizing the device that provides a unique means of powering the apparatus via a conventional power outlet, attracting and electrocuting insects in a conventional manner, tracking the number of insects exterminated for informational and entertainment purposes, and resetting the display when power is removed from and subsequently returned to the apparatus.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
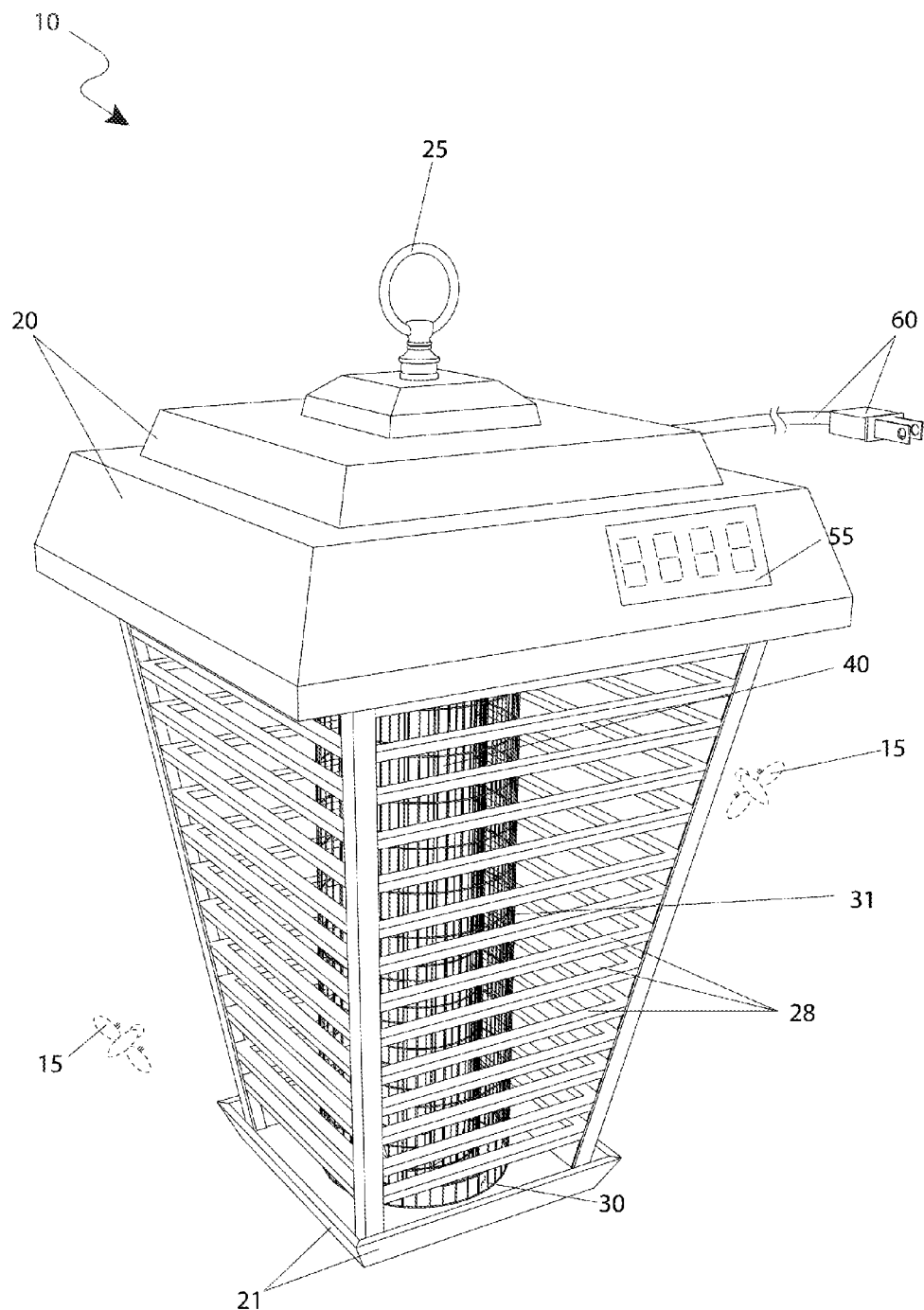
FIG. 1 is a front perspective view of an insect electrocution device with counter 10, according to a preferred embodiment of the present invention.

| | |
|---|---|
| 10 | insect electrocution device with counter |
| 15 | insect |
| 20 | upper structure |
| 21 | lower structure |
| 22 | access aperture |
| 25 | ring |
| 28 | grill |
| 30 | outer grid |
| 31 | inner grid |
| 32 | first clip |
| 33 | second clip |
| 34 | inner slot |
| 35 | outer slot |
| 36 | gap |
| 40 | lamp |
| 42 | socket |
| 50 | counter |
| 55 | display device |
| 60 | power cord |
| 70 | frame |
| 80 | transformer |
| 85 | ballast |
| 86 | starter |
| 87 | outer grid aperture |
| 88 | inner grid aperture |
| 90 | voltmeter |
| 97 | solder |
| 100 | wire |

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an insect electrocution device with counter (herein described as the "apparatus") 10, which provides an electrifying means for controlling insect 15 populations and for counting the amount of electrified flying insects 15. This electronic insect-control zapper is similar thereto conventional insect-control devices, yet it displays a running total of the amount of insects 15 executed thereon an integral display device 55. The apparatus 10 comprises an upper structure 20, a lower structure 21, a grill 28, an outer grid 30, an inner grid 31, a lamp 40, and a counter 50.

The apparatus 10 may be located indoors or outdoors, and is ideal for persons with allergic reactions to insect bites, and those who detest insect repellants.

Figure 2:
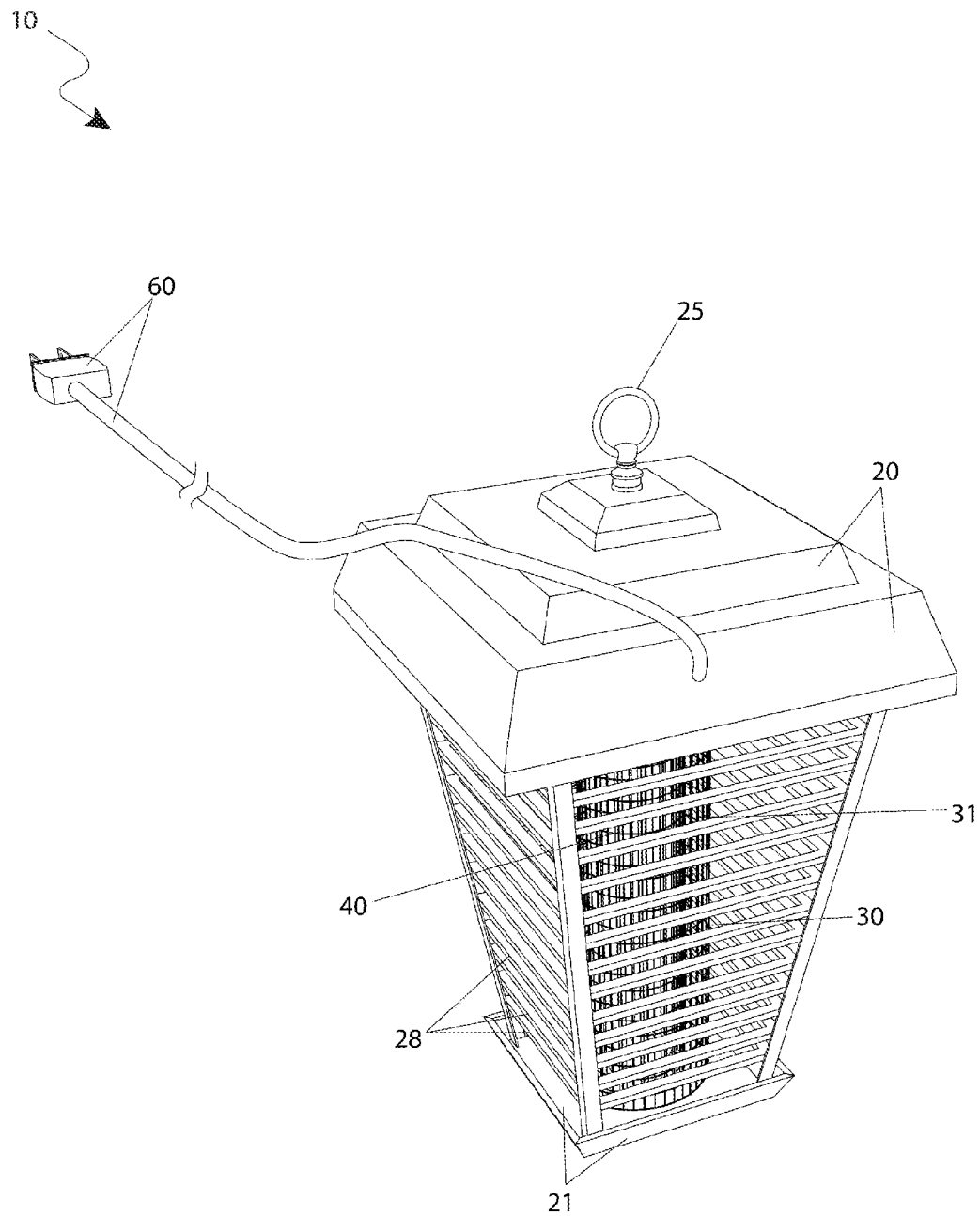
FIG. 2 is a rear perspective view of the insect electrocution device with counter 10, according to a preferred embodiment of the present invention.

Referring now to FIG. 1, a front perspective view of the apparatus 10 and FIG. 2, a rear perspective view of the apparatus 10, according to the preferred embodiment of the present invention, are disclosed. The apparatus 10 comprises a strong and durable waterproof upper structure 20 and lower structure 21 comprising a grill 28 therebetween. The upper structure 20, lower structure 21, and grill 28 are preferably integrally molded to each other, yet other means of attachment may be utilized without limiting the functions of the apparatus 10. The grill 28 comprises a rectangular structure further comprising a plurality of widely meshed sides to protect a user and larger animals from being electrified. The upper structure 20, lower structure 21, and grill 28 create a lantern-shape body, yet other bodies may be utilized without limiting the scope of the apparatus 10. An intermediate upper surface of the upper structure 20 comprises a ring 25, thereby providing a suspension means thereto the apparatus 10. The ring 25 is comprised of a circular device to suspend the apparatus 10 from a desired displaying location in a conventional manner. The upper structure 20, lower structure 21, and grill 28 is fabricated from materials such as, but not limited to: a grounded metal, plastic, or the like.

Figure 5:
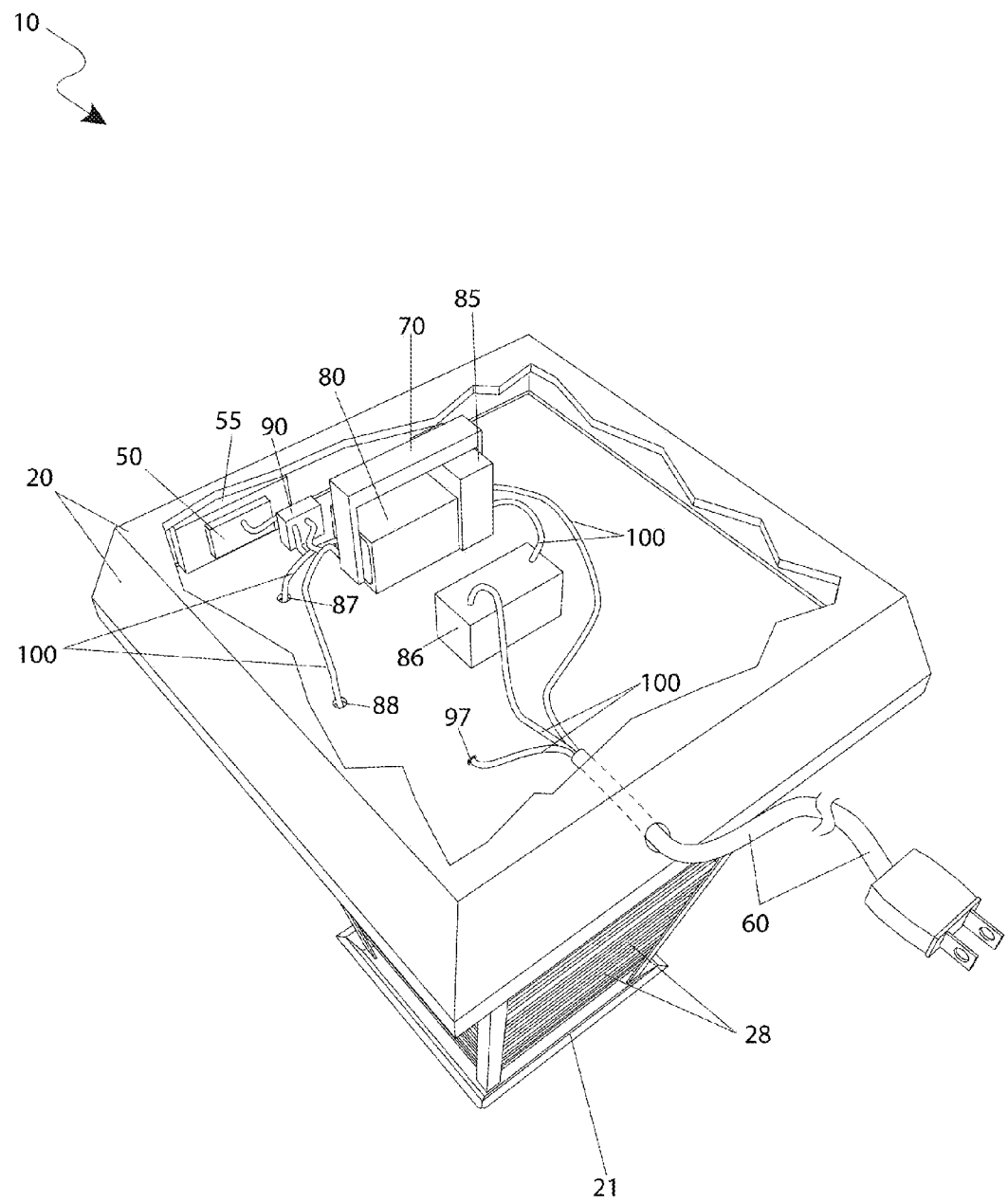
FIG. 5 is a top perspective view of an upper structure 20 depicting an internal configuration of electronic components, according to a preferred embodiment of the present invention; and, FIG. 6 is an electrical block diagram of the insect electrocution device with counter 10, according to a preferred embodiment of the present invention.

A side surface of the upper structure 20 comprises a recessed display device 55, thereby displaying digital numerals corresponding to the count on a counter 50 (also see FIG. 5). The display device 55 is depicted on a side surface for illustration purposes only; it is known that other positions may be utilized without limiting the scope of the apparatus 10. The display device 55 is preferably a standard four (4) digit, seven (7) segment numeric display which increments each time an insect 15 is electrocuted via an internal counter 50, yet other displaying means may be utilized without limiting the scope of the apparatus 10.

Figure 3:
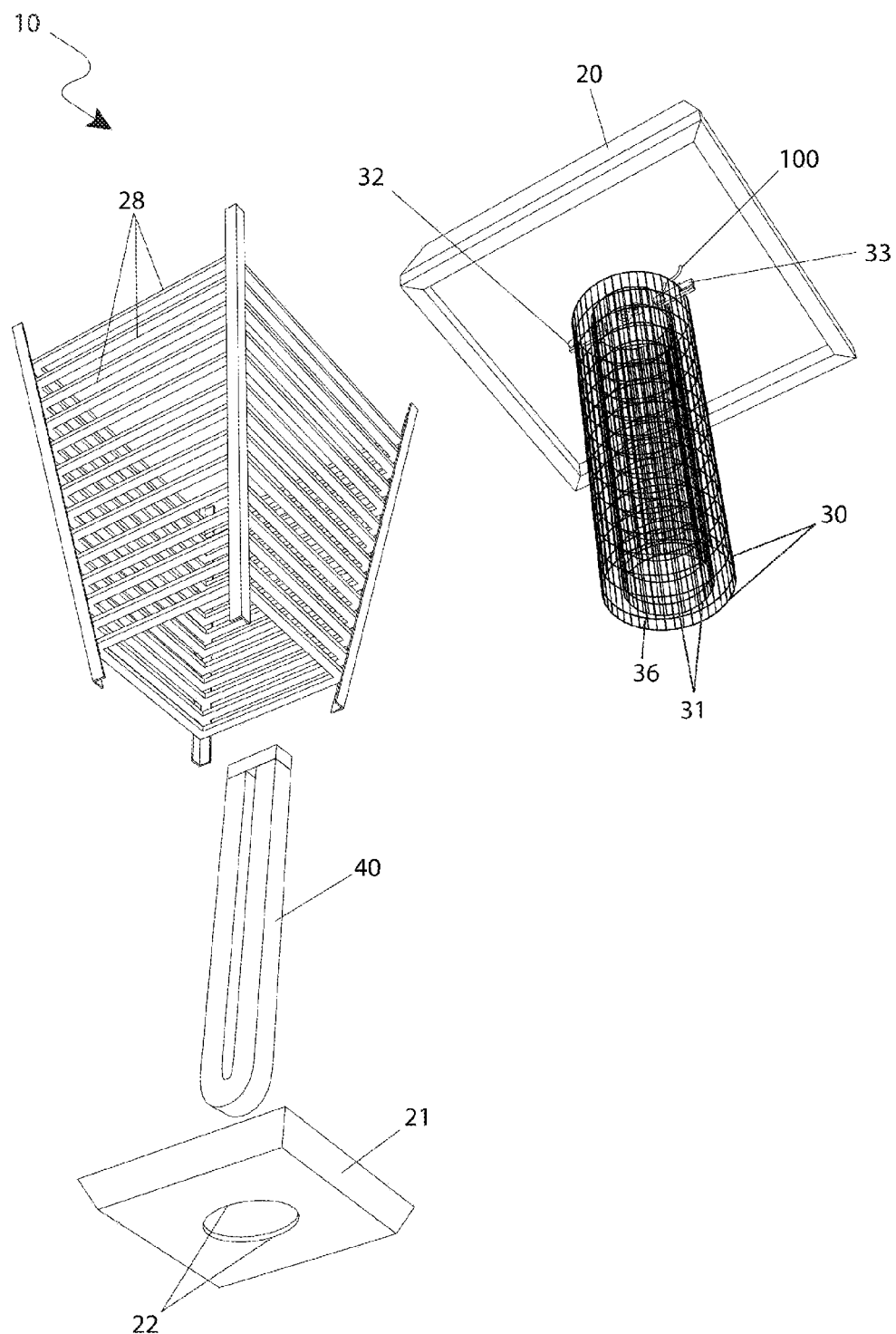
FIG. 3 is an exploded view of the insect electrocution device with counter 10, according to a preferred embodiment of the present invention.

Referring now to FIG. 3, an exploded view of the apparatus 10, according to the preferred embodiment of the present invention, is disclosed. The upper structure 20, lower structure 21, and grill 28 are depicted as being separated for illustration purposes only it is known that the mentioned features are to be integrally molded to each other, thereby providing structural integrity to the apparatus 10. An interior portion of the structure 20 houses a lamp 40, an outer grid 30, and an inner grid 31, thereby providing a means to electrocute the insects 15. The lamp 40 provides a luring means to insects 15 that are attracted to its illumination. The lamp 40 is located at an interior intermediate location within the structure 20 surround by grids 30, 31 and is removable replaceable via a socket 42 (also see FIG. 4). The lamp 40 is to be fabricated from illuminating devices which are utilized in common insect electrocution devices such as, but not limited to: fluorescent lamps, neon lamps, ultraviolet lamps, or the like.

The structure 20 also houses a plurality of wire mesh grids 30, 31 which are electrified by means of a transformer 80 (see FIG. 5). The grids 30, 31 are attached to an underside surface of the upper structure 20 via a first clip 32 and a second clip 33 (also see FIG. 4). The outer grid 30 comprises a diameter larger than the inner grid 31 which enables said inner grid 31 to be positioned within said outer grid 30, thereby creating a gap 36 therebetween. The gap 36 is a sufficient width for insects 15 to bridge said gap 36. The grids 30, 31 surround the lamp 40 and are separated by the gap 36 which is established by the clips 32, 33. As insects 15 are lured into the apparatus 10 via the lamp 40, an electrical arc is produced across the gap 36, thereby completing the grid's 30, 31 circuits and electrocuting said insects 15. The transformer 80 increases the input voltage from 110-VAC to 1800-VAC or above when the insect 15 bridges the gap 36 which electrocutes said insect 15. The transformer 80 is located within the upper structure 20 (see FIG. 5). The grids 30, 31 are preferably fabricated from interleaved bare wire meshed or spiraled materials, yet other materials which conduct current may be utilized without limiting the scope of the apparatus 10.

The lower structure 21 comprises a rectangular shape further comprising an access aperture 22, thereby providing a means to replace the lamp 40 and to allow debris to fall to the ground. The access aperture 22 is located at an intermediate portion of the lower structure 21 and is preferably slightly larger than the width of the lamp 40, thereby enabling the lamp 40 to be removed. The access aperture 22 is also an appropriate diameter to allow insects 15 to descend through said access aperture 22 after being electrocuted.

Figure 4:
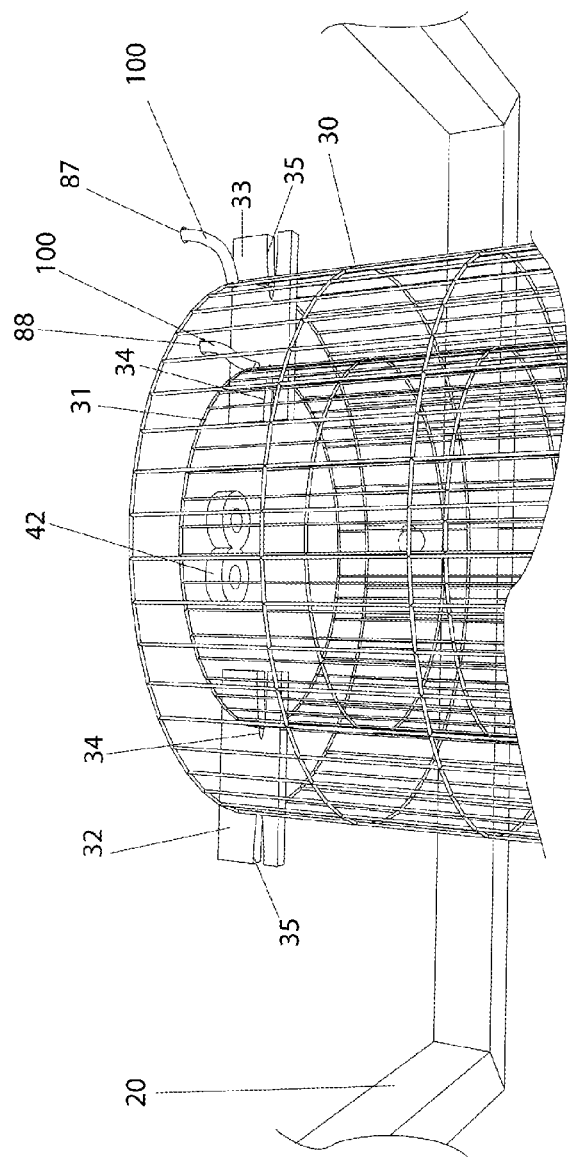
FIG. 4 is a perspective view of an upper structure 20, according to a preferred embodiment of the present invention.

Referring now to FIG. 4, a perspective view of an upper structure 20, according to the preferred embodiment of the present invention, is disclosed. The outer grid 30 and the inner grid 31 are suspended from the apparatus 10 via a first clip 32 and a second clip 33. The clips 32, 33 protrude downwardly and are integrally molded to the underside surface of the upper structure 20. The clips 32, 33 are illustrated as comprising a generally "T"-shaped body comprising an inner slot 34 and an outer slot 35 which utilize an interference fitting means. The inner slot 34 is utilized on each clip 32, 33 to position the inner grid 31 therein and the outer slot 35 is utilized on each said clip 32, 33 to position the outer grid 30 therein. The clips 32, 33 are preferably spaced one-hundred-eighty degrees (180°) from each other, thereby providing proper securement of the grids 30, 31.

The outer grid 30 and the inner grid 31 are supplied with current via transformer 80 and wiring 100 routed from said transformer 80 and through an outer grid aperture 87 and an inner grid aperture 88, respectively. The wiring 100 is attached to an upper surface of each grid 30, 31 preferably via common soldering 97 techniques, yet other means of attachment may be utilized without limiting the scope of the apparatus 10.

Intermediately positioned on the underside surface of the upper structure 20 is the socket 42 which secures the lamp 40 thereto and supplies current to said lamp 40. The socket 42 is preferably attached to the upper structure 20 via integral molding, yet other attachment means may be utilized without limiting the scope of the apparatus 10. The socket 42 also receives current via a starter 86 (see FIG. 5) which is positioned thereabove said socket 42 within the upper structure 20. The lamp 40 engages the socket 42 in a conventional interference fitting manner.

Referring now to FIG. 5, a top perspective view of an upper structure 20 depicting an internal configuration of electronic components, according to the preferred embodiment of the present invention, is disclosed. The apparatus 10 receives 110-V power via a common electrical power cord 60 using an available household circuit, thereby providing current to the lamp 40, the counter 50, the display device 55, the transformer 80, a ballast 85, a starter 86, and a voltmeter 90. Wiring 100 from the power cord 60 is interconnected to the ballast 85, the starter 86, and grounded to the internal surface via solder 97. The starter 86 is a conventional electronic device which supplies a high current to the lamp 40. The starter 86 is also interconnected via wiring 100 to the ballast 85 which is utilized to limit the current to the lamp 40 to an appropriate level. The ballast 85 is secured to the internal surface of the upper structure 20 via a "U"-shaped frame 70 which is further attached to the internal surface via attachment means such as, but not limited to: screws, adhesive, or the like. The frame 70 also secures the transformer 80 in a position and is also interconnected to the ballast 85 via wiring 100, thereby supplying current thereto. The transformer 80 routes the wiring 100 through the grid apertures 87, 88 to the grids 30, 31, thereby supplying current to said grids 30, 31 as abovementioned.

Interconnected to the wiring 100 routed to the grids 30, 31 are a voltmeter 90, the counter 50, and the display device 55. The voltmeter 90 is utilized to sense a change in current, as when an insect 15 bridges the gap 36, to increment the interconnected counter 50. The counter 50 is preferably a standard up-counter incrementally activated every time an insect 15 is electrocuted by means of a connected voltmeter 90 that is attached thereto the grids 30, 31; the voltmeter 90 detects the drop in voltage on the grids 30, 31 and increments the counter 50. The counter 50 resets to zero (0) when the power source is removed from the apparatus 10; this occurs when the power cord 60 is unplugged from a standard household electrical circuit. The counter 50 is attached thereto an electronic displaying device 55 to concurrently display count of insects 15 electrocuted.

Figure 6:
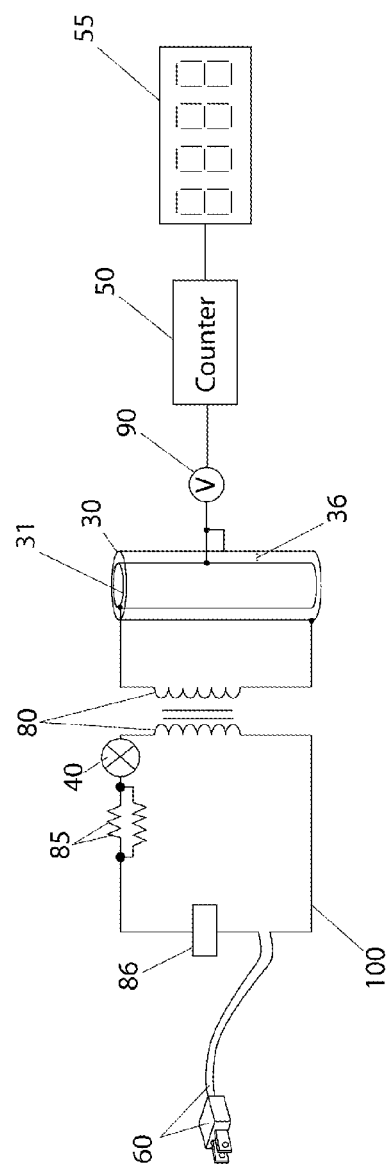

Referring now to FIG. 6, an electrical block diagram thereof the apparatus 10, according to the preferred embodiment of the present invention, is disclosed. The apparatus 10 receives 110-V via plugging the power cord 60 thereinto a household circuit which directs current to the lamp 40, ballast 85, starter 86, transformer 80, voltmeter 90, counter 50, and display device 55. When an insect 15 completes the circuit on the grids 30, 31 the voltage increases and the voltmeter 90 detects said increase. The voltmeter 90 activates the counter 50 thereto increase its count and the displaying device 55 also increments its numerical display. The electrical and electronic components are connected with electrical wiring 100 and are housed therein upper structure 20 of the apparatus 10 as abovementioned.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of utilizing the apparatus 10 may be achieved by performing the following steps: acquiring the apparatus 10; suspending the apparatus 10 thereby the ring 25 in a desired location; supplying current to the apparatus 10 via the power cord 60 which illuminates the lamp 40, activates the internal electrical and electronic components, and electrifies the grids 30, 31 via wiring 100; enabling insects 15 to be lured to the lamp 40 and into the apparatus 10; creating an electrical arc across the gap 36 of the grid's 30, 31 and electrocuting the insects 15; enabling the electrocuted insects 15 to fall through the access aperture 22; utilizing the apparatus 10 as necessary; unplugging the apparatus 10 thereto reset the counter 50; utilizing the access aperture 22 to remove the lamp 40 as necessary; and, providing an entertaining and educational means to insect 15 electrocutions.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A pest control device, comprising:
   a control device housing, comprising an electronic pest control means; and,
   a counting device in electrical communication with said electronic pest control means;
   wherein said electronic pest control means controls a pest that enters said control device housing and is exposed to said electronic pest control means;
   wherein said counting device provides an incremental counting means for each individual pest that is controlled by said control device;
   wherein said control device housing further comprises:
      an upper structure, comprising an attachment means for said electronic pest control means disposed within said control device housing;
      a grill, comprising a four-sided framework of meshed sides having an upper end affixed and depending downward from said upper structure coextensively with said electronic pest control means; and,
      a lower structure, affixed to a lower end of said grill, further comprising a centrally located access aperture;
   wherein said grill provides a protection means for larger animals and humans from incidental exposure to said electronic pest control means while allowing smaller pests access to said electronic pest control device;
   wherein said access aperture provides a means for servicing said electronic pest control means, a means for removal of debris from within said pest control housing, and providing an access for said pests to be exposed to said electronic pest control means;
   wherein said electronic pest control means further comprises:
      a power supply;
      a starter in electrical communication with said power supply, located within said upper structure;
      a ballast in electrical communication with said starter and secured within said upper structure with a frame;
      a transformer in electrical communication with said power supply and secured within said upper structure with said frame adjacent to said ballast;
      a lamp removably attached to a socket within a central location of said upper structure and depending downward from said upper structure and in electrical communication with said starter;
      an outer grid attached via said attachment means to said upper structure and in electrical communication with said transformer; and,
      an inner grid attached via said attachment means to said upper structure and surrounded by said outer grid, thereby defining a gap in between said inner grid and said outer grid, said inner grid in electrical communication with said transformer;
   wherein said ballast limits current to said lamp;
   wherein said inner grid and said outer grid surround said lamp;
   wherein said lamp lures said pest thereto said pest control device;
   wherein said gap comprises a sufficient width to enable said pest to traverse within, wherein said pest completes a circuit between said inner grid and said outer grid when said inner grid and said outer grid are energized;
   wherein said attachment means further comprises a pair of clips integrally molded on a bottom surface of said upper structure and protruding downwardly, each further comprising:
      an inner slot providing an attachment means for said inner grid; and,
      an outer slot providing an attachment means for said outer grid;
   wherein said pair of clips are spaced one-hundred-eighty degrees from each other, such that said inner grid and said outer grid are securely attached thereto;
   wherein said counting device is directly coupled to said counting device housing and located therein;
   wherein said attachment means is spaced inwardly from an inner wall of said upper structure;
   wherein each of said clips has a longitudinal length radially extending relative to a center of said inner and outer grids, respectively; and,
   wherein each of said clips is directly engaged with each of said inner and outer grids, respectively.

2. The pest control device of claim 1, wherein said control device housing further comprises a lantern-shaped molded structure comprising a resilient and durable waterproof material.

3. The pest control device of claim 1, further comprising a suspension means located on a central upper surface of said upper structure to suspend said pest control device from a support structure.

4. The pest control device of claim 1, wherein said transformer increases an input voltage from 110-VAC to at least 1800-VAC or above when said pest bridges said gap.

5. The pest control device of claim 1, wherein said lamp comprises one of the following list: a fluorescent lamp, a neon lamp, and an ultraviolet lamp.

6. The pest control device of claim 1, wherein said inner grid and said outer grid each comprises a cylindrical interleaved bare wire meshed or spiraled material.

7. The pest control device of claim 1, wherein said counting device further comprises:
   a voltmeter in electrical communication with said inner and outer grids, located within said upper structure;
   a counter in electrical communication with said voltmeter, located within said upper structure; and,
   a display device in electrical communication with said counter, located thereon said control device housing;
   wherein said voltmeter senses a drop in voltage when said pest completes said circuit between said inner grid and said outer grid and generates and transmits a sensed signal;
   wherein said counter senses said sensed signal and transmits an incremental signal to said display device; and,
   wherein said display device displays said incremental signal.

8. The pest control device of claim 7, wherein said display device comprises a four-digit, seven-segment numeric digital display located in a recess portion of said upper structure.

9. The pest control device of claim 7, wherein said counter resets to zero upon cessation of power.

10. A pest control device, comprising:
a control device housing, comprising a lantern-shaped molded structure comprising a resilient and durable waterproof material, further comprising:
  an upper structure, comprising an attachment means for said electronic pest control means disposed within said control device housing;
  a grill, comprising a four-sided framework of meshed sides having an upper end affixed and depending downward from said upper structure coextensively with said electronic pest control means; and,
  a lower structure, affixed to a lower end of said grill, further comprising a centrally located access aperture;
a counting device in electrical communication with said electronic pest control means;
wherein said electronic pest control means controls a pest that enters said control device housing and is exposed to said electronic pest control means;
wherein said counting device provides an incremental counting means for each individual pest that is controlled by said control device;
wherein said grill provides a protection means for larger animals and humans from incidental exposure to said electronic pest control means while allowing smaller pests access to said electronic pest control device;
wherein said access aperture provides a means for servicing said electronic pest control means, a means for removal of debris from within said pest control housing, and providing an access for said pests to be exposed to said electronic pest control means;
wherein said electronic pest control means further comprises:
  a power supply;
  a starter in electrical communication with said power supply, located within said upper structure;
  a ballast in electrical communication with said starter and secured within said upper structure with a frame;
  a transformer in electrical communication with said power supply and secured within said upper structure with said frame adjacent to said ballast;
  a lamp removably attached to a socket within a central location of said upper structure and depending downward from said upper structure and in electrical communication with said starter;
  a cylindrical interleaved bare wire meshed or spiraled outer grid in electrical communication with said transformer;
  a cylindrical interleaved bare wire meshed or spiraled inner grid and surrounded by said outer grid, thereby defining a gap in between said inner grid and said outer grid, said inner grid in electrical communication with said transformer; and,
  a pair of clips integrally molded on a bottom surface of said upper structure and protruding downwardly spaced one-hundred-eighty degrees from each other, each further comprising:
    an inner slot providing an attachment means for said inner grid to said upper structure; and,
    an outer slot providing an attachment means for said outer grid to said upper structure;
wherein said ballast limits current to said lamp;
wherein said inner grid and said outer grid surround said lamp;
wherein said lamp lures said pest thereto said pest control device;
wherein said gap comprises a sufficient width to enable said pest to traverse within, wherein said pest completes a circuit between said inner grid and said outer grid when said inner grid and said outer grid are energized;
wherein said counting device is directly coupled to said counting device housing and located therein;
wherein said attachment means is spaced inwardly from an inner wall of said upper structure;
wherein each of said clips has a longitudinal length radially extending relative to a center of said inner and outer grids, respectively; and,
wherein each of said clips is directly engaged with each of said inner and outer grids, respectively.

11. The pest control device of claim 10, further comprising a suspension means located on a central upper surface of said upper structure to suspend said pest control device from a support structure.

12. The pest control device of claim 10, wherein said transformer increases an input voltage from 110-VAC to at least 1800-VAC or above when said pest bridges said gap.

13. The pest control device of claim 10, wherein said lamp comprises one of the following list: a fluorescent lamp, a neon lamp, and an ultraviolet lamp.

14. The pest control device of claim 10, wherein said counting device further comprises:
  a voltmeter in electrical communication with said inner and outer grids, located within said upper structure;
  a counter in electrical communication with said voltmeter, located within said upper structure; and,
  a display device in electrical communication with said counter, located thereon said control device housing;
wherein said voltmeter senses a drop in voltage when said pest completes said circuit between said inner grid and said outer grid and generates and transmits a sensed signal;
wherein said counter senses said sensed signal and transmits an incremental signal to said display device; and,
wherein said display device displays said incremental signal.

15. The pest control device of claim 14, wherein said display device comprises a four-digit, seven-segment numeric digital display located in a recess portion of said upper structure.

16. The pest control device of claim 14, wherein said counter resets to zero upon cessation of power.

* * * * *